No. 731,645. PATENTED JUNE 23, 1903.
F. W. WILSON.
DISK FURROW OPENER OR CLOSER FOR SEED PLANTERS.
APPLICATION FILED OCT. 11, 1902.
NO MODEL.

Witnesses:
H. Manger.
L. L. Leibrock.

Inventor: Frederick W. Wilson.
by Orwig & Lane Atty's.

No. 731,645.

Patented June 23, 1903.

UNITED STATES PATENT OFFICE.

FREDERICK W. WILSON, OF IRA, IOWA, ASSIGNOR OF ONE-FOURTH TO G. M. WILSON, OF IRA, IOWA.

DISK FURROW OPENER OR CLOSER FOR SEED-PLANTERS.

SPECIFICATION forming part of Letters Patent No. 731,645, dated June 23, 1903.

Application filed October 11, 1902. Serial No. 126,956. (No model.)

*To all whom it may concern:*

Be it known that I, FREDERICK W. WILSON, a citizen of the United States, residing at Ira, in the county of Jasper and State of Iowa, have invented certain new and useful Improvements in Disk Furrow Openers and Closers for Seed-Planters, of which the following is a specification.

The objects of my invention are to provide a device of simple, durable, and inexpensive construction, susceptible of attachment to an ordinary corn-planter or the like in place of the runner and planter-leg now in common use, whereby as the planter is moved over the ground-surface a furrow of even depth will be made in the ground and any stalks, roots, or other obstructions on the ground-surface will either be cut or pushed aside, so as not to interfere with the opening of the furrow to an even depth; and, further, it is my object to provide a planter-leg having a shoe on the end of such shape as to prevent clods of earth or large obstructions from entering the furrow as it is opened, so that the seeds passed through said planter-leg may be deposited upon the bottom of the furrow, and to provide a furrow-closer which will cover the seeds thus planted to an even depth and without danger of stalks, roots, or other obstructions clogging or interfering with its operation.

A further object is to provide a device of this class which may be quickly and easily adjusted vertically relative to the machine-frame, whereby a furrow of any desirable depth may be cut, so that seeds may be planted at any depth desired.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
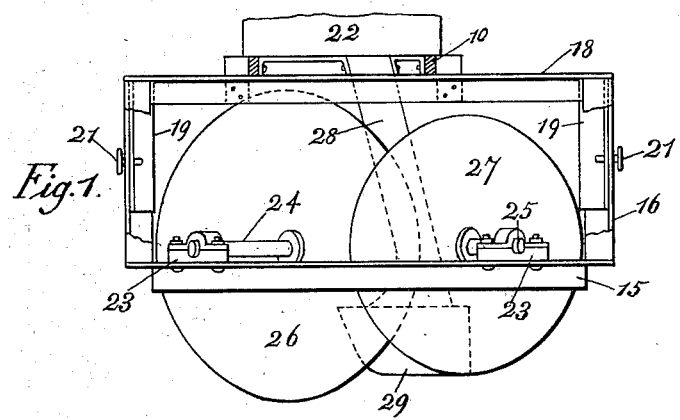
Figure 2:
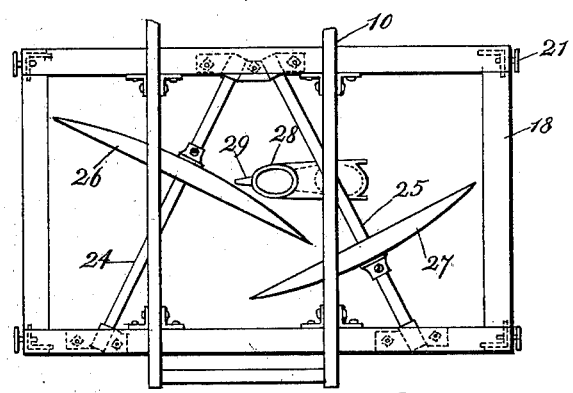
Figure 4:
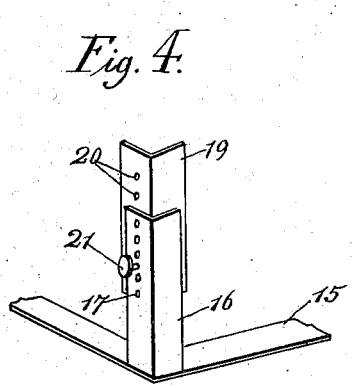
Figure 3:
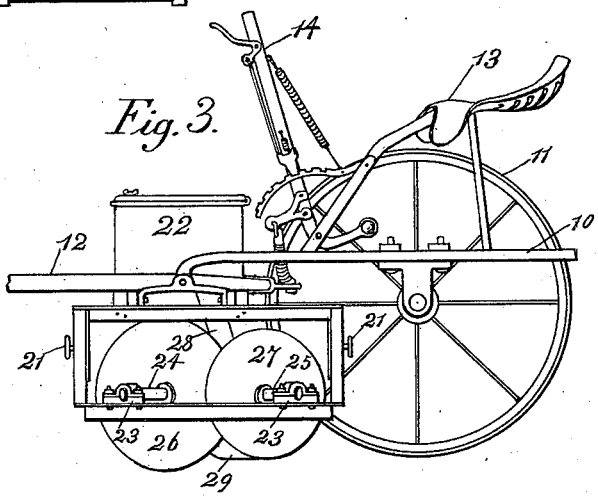

Figure 1 shows a side elevation of my improved furrow opening and closing device attached to a part of a corn-planter frame, portions of the uprights of the frame being broken away. Fig. 2 shows a top or plan view of same. Fig. 3 shows a side elevation of a corn-planter of ordinary construction with one of the wheels and one of the seed-boxes removed and showing my attachment applied thereto as in practical use, and Fig. 4 shows an enlarged detail perspective view illustrating the means by which the frame of the furrow opener and closer is vertically adjusted.

Referring to the accompanying drawings, the reference-numeral 10 is used to indicate that part of the machine-frame shown. This frame is supported upon wheels, the one shown being indicated by the numeral 11. 12 indicates the tongue, and 13 the driver's or operator's seat. 14 indicates a lever by which the rear end of the tongue and the forward part of the machine-frame may be elevated. These parts are all of the ordinary construction and any modification may be successfully used with my attachment.

The frame of my attachment is indicated by the reference-numeral 15 and is preferably rectangular in shape and made of L-shaped iron bars. At the four corners thereof are the uprights 16, each being provided with a row of perforations 17. The numeral 18 indicates a similar frame, having downwardly-projecting bars 19, provided with rows of perforations 20, and the set-screws 21 are capable of passing through these rows of openings, so that the frame 15 may be vertically adjusted relative to the frame 18 and securely held when in either position. This frame 18 is firmly fixed to the said part of the machine-frame 10 in any desirable way, and the seed-boxes 22 are fixed directly above the frames 18. The said frame 15 is provided with bearing-boxes 23 to support the shafts 24 and 25, each of which is arranged at an acute angle relative to a fore-and-aft line through the machine. Upon the forward shaft 25 I have mounted a concavo-convex disk 26, having sharpened edges fixed in position at right angles to its shaft, and upon the shaft 25 I have mounted a similar disk 27 of smaller diameter, also fixed at right angles to its shaft 25. These disks are so arranged relative to each other that as the machine is advanced over the ground-surface the forward disk 26 will cut a furrow in the ground and throw the earth toward the forward edge of the disk 27, and this disk 27 being of smaller diameter will return part of the earth into the furrow, so as to leave the ground comparatively smooth and to fill the furrow level with the adjoining ground-surface. Both of these wheels rotate automatically during the advance of the machine and, obviously, no stalks, roots, or other obstructions can be caught or entangled thereon on account of their rotary movement, and they will also polish themselves and keep clean.

The planter-leg is indicated by the reference-numeral 28. It connects at its upper end with one of the seed-boxes and extends downwardly and rearwardly. On its lower end is a shoe 29, the under surface of which is some distance above the level of the lower edge of the furrow-opening disk, and the shoe stands directly in the center of the furrow opened by the forward disk, and it extends forwardly to a point near the vertical center of the forward disk, so that it runs in the furrow as near as may be possible to the point where the furrow is opened. Hence clods of earth or the like thrown out by the furrow-opening disk may not enter the furrow in front of the said shoe, but the said shoe will hold back any such clods of earth until the seeds have been planted, and the loose earth will then be thrown back into the furrow by the furrow-closing disk. This result, obviously, can only be accomplished by means of a shoe extended forwardly to a point where the furrows open, and by elevating this shoe above the bottom of the furrow there will be no danger of the shoe collecting earth or other substance, as is the case where shoes of this class run in the ground. In other words, the shoe will easily keep itself clean, and yet will prevent clods of earth or the like from entering the furrow until after the seeds have been properly planted.

In practical use it is obvious that my attachment may be applied to any ordinary corn-planter by simply removing the runners and substituting my attachment in lieu thereof. Then as the machine is advanced over the ground-surface the furrows are opened and clods of earth kept out of the center of the furrow until after the seeds are planted, and then the furrow is closed and any stalks, roots, or other obstruction are either cut or thrown to one side and the disks and runners are kept free from accumulated earth or other obstructions by reason of their arrangement and combination relative to each other. Furthermore, the attachment may be adjusted vertically, so as to be readily adaptable to machines of any ordinary size, and, furthermore, the device may readily be elevated by means of the lever 14 to clear the ground or to cut into the ground to any desirable depth in the same way as the ordinary runners are now manipulated.

Having thus described my invention, what I claim, and desire to secure by Letters Patent of the United States therefor, is—

1. In a device of the class described, the combination of a rotary furrow-opening disk arranged at an acute angle relative to the line of advance, a shoe immediately in the rear of the central portion thereof with its lower edge some distance above that of the disk, and a furrow-closing disk arranged at an acute angle relative to the line of advance and inclined in a direction opposite from that of the furrow-opening disk and having its lower edge directly in the rear of the rear edge of the furrow-opening disk and some distance above the lower edge of the furrow-opening disk.

2. In a device of the class described, the combination of a large furrow-opening disk rotatably mounted and standing at an acute angle relative to the line of advance, a planter-leg immediately in the rear of the central portion of said disk, a shoe at the lower end of the planter-leg and its forward edge immediately in the rear of the central portion of the said disk and having its under surface some distance above the lower edge of said disk, and a furrow-closing disk rotatably mounted in the rear of the furrow-opening disk arranged at an acute angle relative to the line of advance and extending in an opposite direction from the furrow-opening disk with its lower edge substantially in line with the rear edge of the furrow-opening disk and its rear edge extended in a direction toward a fore-and-aft line through the said shoe.

3. In a device of the class described, the combination with a planter, of a frame, two rotatable axles mounted in said frame, a furrow-opening disk fixed to the forward axle and arranged at an acute angle relative to the line of advance, a furrow-closing disk on the other axle arranged at an acute angle relative to the line of advance and extended in an opposite direction from that of the furrow-opening disk, a planter-leg between the two, a second frame fixed to the planter-frame and means for adjustably connecting said frames with each other, for the purposes stated.

4. The combination with a seed-planter, of a frame fixed to the planter-frame and having downwardly-extended bars, a second frame having upwardly-extending bars, means for adjustably connecting these bars with each other, two rotatable axles on the lower frame, a furrow-opening disk fixed to the forward axle, a furrow-closing disk fixed to the rear axle, a planter-leg supported between the two, and a shoe on the lower end of the planter-leg directly in the rear of the fore-and-aft center of the furrow-opening disk and having its lower edge some distance above the lower edge of the furrow-opening disk, substantially as and for the purposes stated.

FREDERICK W. WILSON.

Witnesses:
W. W. GOODRICH,
GEO. M. WILSON.